United States Patent
Fukushima

(10) Patent No.: US 6,795,143 B1
(45) Date of Patent: Sep. 21, 2004

(54) LIQUID CRYSTAL DISPLAY DEVICE AND METHOD FOR MANUFACTURING THE SAME

(75) Inventor: Yasumori Fukushima, Fukuyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 257 days.

(21) Appl. No.: 09/663,672

(22) Filed: Sep. 18, 2000

(30) Foreign Application Priority Data

Sep. 22, 1999 (JP) .................................. H11-268614

(51) Int. Cl.⁷ .............................................. G02F 1/13
(52) U.S. Cl. ...................... 349/110; 349/111; 349/44
(58) Field of Search ............................. 349/110, 111, 349/44

(56) References Cited

U.S. PATENT DOCUMENTS

| | | | | |
|---|---|---|---|---|
| 4,948,231 A | * | 8/1990 | Aoki et al. | 349/110 |
| 4,984,033 A | * | 1/1991 | Ishizu et al. | 349/110 |
| 5,510,916 A | * | 4/1996 | Takahashi | 349/110 |
| 5,782,665 A | * | 7/1998 | Weisfield | 349/111 |
| 6,057,896 A | * | 5/2000 | Rho et al. | 349/110 |
| 6,219,118 B1 | * | 4/2001 | Zhang | 349/110 |
| 6,297,862 B1 | * | 10/2001 | Murage | 349/110 |
| 6,344,885 B1 | * | 2/2002 | Mori et al. | 349/44 |
| 6,449,022 B1 | * | 9/2002 | Fukata et al. | 349/44 |

FOREIGN PATENT DOCUMENTS

| | | |
|---|---|---|
| JP | 6-082829 | 3/1994 |
| JP | 10-293320 | 4/1998 |
| JP | 11-038437 | 12/1999 |

* cited by examiner

Primary Examiner—James A. Dudek
(74) Attorney, Agent, or Firm—Nixon & Vanderhye PC

(57) ABSTRACT

The object of the invention is to provide an active matrix liquid crystal display device having improved brightness and higher contrast, and the method for manufacturing the same. An active matrix liquid crystal display device has on the upper side and the lower side of the switching element, arranged in matrix, a lower shading layer and an upper shading layer. Either the lower shading layer or the upper shading layer is, or both the lower and upper shading layers are, formed to have a convex shape and a sloped portion protruding toward the switching element.

20 Claims, 11 Drawing Sheets

Fig. 10
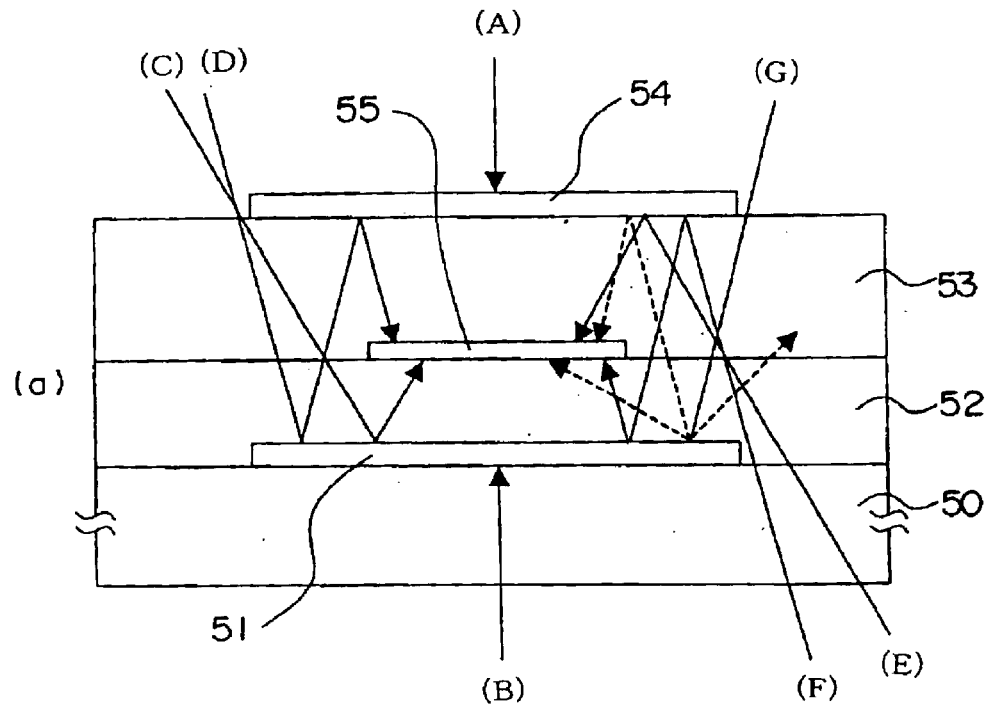
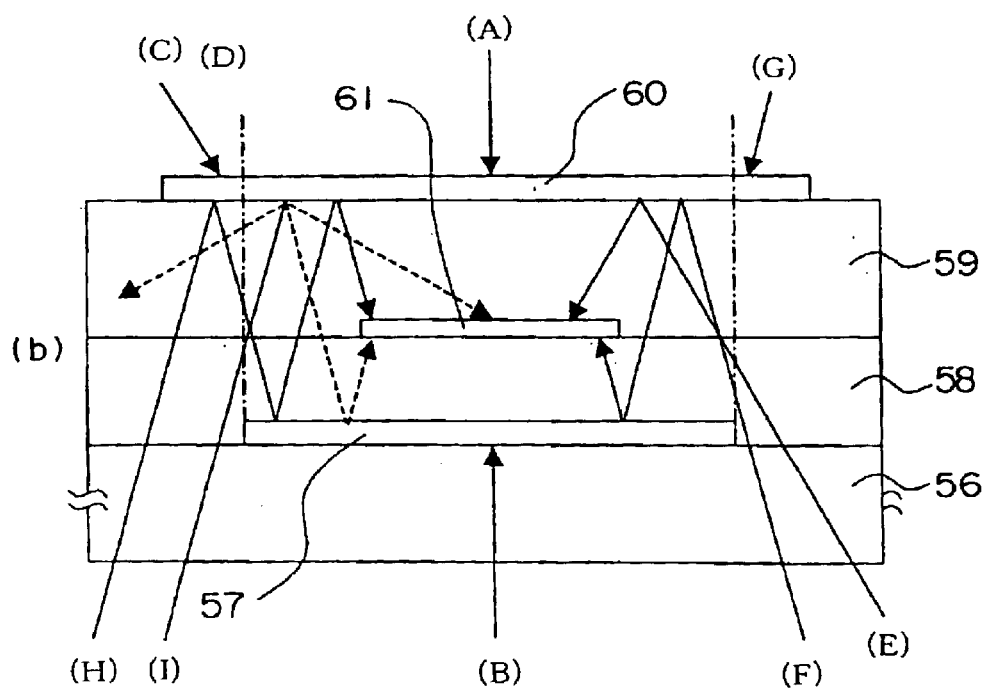

LIQUID CRYSTAL DISPLAY DEVICE AND METHOD FOR MANUFACTURING THE SAME

FIELD OF THE INVENTION

The present invention relates to an active matrix liquid crystal display device utilizing a switching element such as a thin film transistor (hereinafter called TFT), and the method for manufacturing the same, and more specifically, to a shading means for shading the switching element, and the method for manufacturing the same.

DESCRIPTION OF THE RELATED ART

Liquid crystal display devices are known for their advanced characteristics such as being light-weight, having reduced thickness, and exhibiting low power consumption, and active research and development is performed in the field. A liquid crystal display comprises "pixel elements" arranged in matrix, which are formed by placing liquid crystal molecules in between transparent electrodes. When an arbitrary voltage is provided between the transparent electrodes corresponding to each pixel element, the alignment of the liquid crystal molecules in the pixel element is changed, and the degree of polarization of the light passing through the liquid crystal is varied, which leads to controlling the transmission rate of the light. The liquid crystal display device is divided into two types based on operation principles, that is, the simple matrix type and the active matrix type. Since the active matrix liquid crystal display device utilizes active elements, TFTs, switching elements for individual pixel elements, independent signals can be transmitted to each pixel element, and the device provides improved resolution and a clear display image.

A TFT utilizing amorphous silicon thin film is often used as the switching element for the active matrix liquid crystal display device. Moreover, a recently proposed technique refers to a TFT that utilizes a polysilicon thin film formed either by heat treating an amorphous silicon thin film in a temperature over 600° C., or by providing a laser crystallization in which a pulse laser (such as an excimer laser) is radiated to the thin film for recrystallization. The polysilicon thin film is advantageous in that it has higher mobility compared to the amorphous silicon thin film, which allows for not only the switching elements for the pixels but also the driving circuit for driving the switching elements of the pixels to be formed on the same substrate using the polysilicon TFT.

As mentioned above, the liquid crystal display device controls the transmission rate of the light passing through the liquid crystal by changing the degree of polarization of the light passing through the liquid crystal, but the device itself is not equipped with a light emitting member. Therefore, a light source of some sort must be provided to the device. For example, in the case of a transmission-type liquid crystal display device, a lighting device, a so-called light, is placed on the back side of the liquid crystal display, and the light transmitted through the device enables images to be displayed. In the case of a projector, a metal halide lamp and the like are used as the light source, and image is projected by combining the liquid crystal display device with a lens system. Moreover, in case of a reflection-type display, the incident light provided from the exterior is reflected by a reflecting electrode in order to display an image.

In general, if light is radiated to a semiconductor, such as silicon, and light absorption occurs, electrons are excited to the conductive band and positive holes are excited to the valence band, generating electron-hole pairs and causing a so-called photoelectric effect. The same could be said for the amorphous silicon thin film or the polysilicon thin film utilized as the pixel switching elements. By radiating light thereto, electron-hole pairs are generated in the thin film. Accordingly, when light is radiated to the TFT using either the amorphous silicon thin film or the polysilicon thin film as the active layer, photocurrent is caused by the electron-hole pairs, which increases the leak current during the off-state of the TFT. This leads to deteriorating the contrast and the like of the liquid crystal display.

In the case of a reflection-type liquid crystal display device, the reflecting electrode mainly composed of a metal film connected to the TFT is arranged to cover the TFT, so that no incident light from the exterior reaches the TFT directly. Accordingly, TFT leak current is prevented from increasing. However, in the case of a transmission-type liquid crystal display device, the TFT is not only exposed constantly to the strong light from the back light, but some incident light other than that from the back light also tends to reach the TFT. Moreover, in the case of projectors, the light reflected by the lens may reach the TFT. Accordingly, various inventions are proposed that aim at preventing incident light from reaching the TFT.

For example, as shown in FIG. 11, shading film 63 and shading film 64 are provided above and under the switching electrode 62 via insulation layers, in order to block the light coming from above and under the switching element (Japanese Patent Application Laid-Open Publication No. 58-159516). This is effective in reducing leak current, and in improving display characteristics.

According to another proposal, as shown in FIG. 12, in an adhered SOI substrate, an upper shading layer 66 and a lower shading layer 67 are provided above and under a MOSFET 65, in order to block the direct incident light coming from above and under the MOSFET, and to also block the light reflected by the back surface of the substrate, thereby effectively preventing an increase of TFT leak current (Japanese Patent Application Laid-Open Publication No. 10-293320).

According to yet another proposal, as shown in FIG. 13, by providing a shading film 69 under the switching element 68 and providing a black matrix 70 formed of silicon thin film and silicide film on the opposing substrate, not only the direct incident light is blocked, but also the reflection of light within the liquid crystal display device is restrained, since the fine unevenness provided to the surface reduces the reflection rate and diffuses light (Japanese Patent Application Laid-Open Publication No. 10-319435).

According to the above method, shading layers are provided above and under the TFT so as to prevent incident light coming in from the exterior from reaching the semiconductor film or active layer of the TFT, and most of the incident light fails to reach the semiconductor film. However, the incident angle of the light coming into the liquid crystal display device is not always perpendicular the substrate, but has a certain degree of dispersion, and the light entering the display device may be repeatedly reflected within the device. When light reaches the TFT according to these reasons, the light causes problems such as an increase of TFT leak current.

As shown in FIG. 10(a), light (A) and light (B) are blocked by the upper shading layer 54 and the lower shading layer 51, and they will not reach the TFT 55. However, the oblique incident light (C) coming from the side of upper shading layer 54 is reflected by the lower shading layer 51, and reaches the TFT 55. Moreover, the oblique incident light (D) coming from the side of upper shading layer 54 side is reflected by the lower shading layer 51, then reflected by the upper shading layer 54, before reaching the TFT 55. Similarly, the incident light (E) and (F) coming from the side of lower shading layer 51 also reaches the TFT 55 after being reflected one or more times. Therefore, according to the proposal of Japanese Patent Application Laid-Open Publication No. 58-159516, light traveling as mentioned above will reach the transistor causing an increase of leak current.

Moreover, as shown in FIG. 10(b), when the upper shading layer 60 is larger than the lower shading layer 57, the oblique incident light (C), (D) and (G) coming from the side of upper shading layer 60 is blocked by the upper shading layer, but on the other hand the oblique incident light (E), (F) and (I) coming from the side of lower shading layer 57 still reaches the TFT 61, and the oblique incident light (H) coming from the side of lower shading layer that would not have reached the TFT if the upper and lower shading layers were the same size also reaches the TFT 61 since it is reflected by the back surface of the upper shading layer 60. As mentioned above, according to the invention disclosed in Japanese Patent Application Laid-Open Publication No. 10-293320, light traveling as described above will reach the transistor causing an increase of leak current.

Moreover, according to the method indicated in Japanese Patent Application Laid-Open Publication No. 10-319435, the light (G) coming in from the side of upper shading layer 54 shown in FIG. 10(a), or the light (I) coming in from the side of lower shading layer 57 shown in FIG. 10(b) will be diffused by the fine unevenness of the surface of the shading layer, and some of the light that would have reached the TFT if not for the diffusion will be removed effectively. However, since the direction of light reflected by the uneven surface of the shading layer is random, the light that would have reached the TFT by the second reflection if the surface of the shading layer were smooth would reach the TFT by a single reflection. The described arrangement causes some light to reach the TFT more easily, thereby causing an increase of leak current, similarly to the other two prior art examples.

As explained above, it is difficult according to prior art techniques to prevent incident light traveling obliquely into the display device from above and under the device from reaching the TFT. By sufficiently increasing the size of the upper and lower shading films, it may be possible to reduce the intensity of the light reaching the TFT reflecting many times on the upper and lower shading films, by the reflection rate of the upper and lower shading films and the light absorption caused by the insulation film between the upper and lower shading films. However, according to such a method, the area of the shading films are insufficiently increased, causing other problems such as reduction of aperture rate, an important element of liquid crystal displays. Moreover, the increase of size of the shading films does not fundamentally prevent light from reaching the TFT.

SUMMARY OF THE INVENTION

Problems to be Solved by the Invention

The present invention aims at solving the above-mentioned problems. The object of the present invention is to provide an active matrix liquid crystal display having improved brightness and high contrast, and the method of manufacturing the same.

Means for Solving Problem

The present invention provides an active matrix liquid crystal display device comprising a liquid crystal cell, a switching element arranged in matrix, and shading layers mounted both on the upper side and the lower side of the switching element; wherein at least one of the upper and lower shading layers includes a sloped portion and has a convex shape protruding toward the switching element.

The present invention also provides an active matrix liquid crystal display device comprising a liquid crystal cell, a switching element arranged in matrix, and shading layers mounted both on the upper side and the lower side of the switching element; the upper shading layer including an upper sloped portion and having a convex shape protruding toward the switching element, the lower shading layer having a flat shape: wherein the upper shading layer is formed so that the upper sloped portion is located at a $\theta_1$ angle to the horizontal direction, and the upper sloped portion has a horizontal direction length of $l_{11}$; the lower shading layer is formed so that the length from the end of the lower shading layer to the point that the line drawn downward to the vertical direction from the origin of the upper sloped portion crosses the lower shading layer is $l_{12}$; and the maximum incident angle of the incident angle of the light traveling obliquely from the upper shading layer side is $\alpha_1$, the maximum incident angle of the light traveling obliquely from the lower shading layer side is $\beta_1$, and the distance between the upper shading layer and the lower shading layer is $d_1$, in which $\theta_1$, $l_{11}$ and $l_{12}$ each fulfill $\theta_1 > \beta_1$, $l_{11} > (l_{12} + d_1 \cdot \tan \alpha_1)/(1 - \tan \theta_1 \cdot \tan \alpha_1)$, and $l_{12} > d_1 \cdot \tan \beta_1$.

Moreover, the present invention provides an active matrix liquid crystal display device comprising a liquid crystal cell, a switching element arranged in matrix, and shading layers mounted both on the upper side and the lower side of the switching element; the lower shading layer including a lower sloped portion and having a convex shape protruding toward the switching element, the upper shading layer having a flat shape: wherein the lower shading layer is formed so that the lower sloped portion is located at a $\theta_2$ angle to the horizontal direction, and the lower sloped portion has a horizontal direction length of $l_{21}$; the upper shading layer is formed so that the length from the end of said upper shading layer to the point that the line drawn upward to the vertical direction from the origin of the lower sloped portion crosses the upper shading layer is $l_{22}$; and the maximum incident angle of the light traveling obliquely from the lower shading layer side is $\alpha_2$, the maximum incident angle of the light traveling obliquely from the upper shading layer side is $\beta_2$, and the distance between the upper shading layer and the lower shading layer is $d_2$, in which $\theta_2$, $l_{21}$ and $l_{22}$ each fulfill $\theta_2 > \beta_2$, $l_{21} > (l_{22} + d_2 \cdot \tan \alpha_2)/(1 - \tan \theta_2 \cdot \tan \alpha_2)$, and $l_{22} > d_2 \cdot \tan \beta_2$.

Further, the present invention provides an active matrix liquid crystal display device comprising a liquid crystal cell, a switching element arranged in matrix, and shading layers mounted both on the upper side and the lower side of the switching element; the upper and lower shading layers respectively including an upper sloped portion or a lower sloped portion, both having a convex shape protruding toward the switching element, and the lower sloped portion formed longer than the upper sloped portion: wherein the upper shading layer is formed so that the upper sloped portion is located at a $\theta_{31}$ angle to the horizontal direction, and the upper sloped portion has a horizontal direction length of $l_{31}$; the lower shading layer is formed so that the lower sloped portion is located at a $\theta_{32}$ angle to the horizontal direction, and the lower sloped portion has a horizontal direction length of $l_{32}$; and the maximum incident angle of the light traveling obliquely from the upper, shading layer side is $\alpha_3$, the maximum incident angle of the light traveling obliquely from the lower shading layer side is $\beta_3$, and the distance between the upper shading layer and the lower shading layer is $d_3$, in which $\theta_{31}$, $\theta_{32}$, $l_{31}$ and $l_{32}$ each fulfill $\theta_{31} > \beta_3$, $\theta_{32} > \alpha_3$, $l_{31} > \tan \beta_3 \cdot (d_3 + l_{32} \cdot \tan \theta_{32})$, and $l_{32} > \tan \alpha_3 \cdot (d_3 + l_{31} \cdot \tan \theta_{31})$.

Moreover, the present invention provides an active matrix liquid crystal display device comprising a liquid crystal cell, a switching element arranged in matrix, and shading layers mounted both on the upper side and the lower side of the switching element; the upper and lower shading layers respectively including an upper sloped portion or a lower sloped portion, both having a convex shape protruding toward the switching element, and the upper sloped portion formed longer than the lower sloped portion: wherein the lower shading layer is formed so that the lower sloped portion is located at a $\theta_{41}$ angle to the horizontal direction, and the lower sloped portion has a horizontal direction length of $l_{41}$; the upper shading layer is formed so that the upper sloped portion is located at a $\theta_{42}$ angle to the horizontal direction, and the upper sloped portion has a horizontal direction length of $l_{42}$; and the maximum incident angle of the light traveling obliquely from the lower shading layer side is $\alpha_4$, the maximum incident angle of the light traveling obliquely from the upper shading layer side is $\beta_4$, and the distance between the lower shading layer and the upper shading layer is $d_4$, in which $\theta_{41}$, $\theta_{42}$, $l_{41}$ and $l_{42}$ each fulfill $\theta_{41} > \beta_4$, $\theta_{42} > \alpha_4$, $l_{41} > \tan \beta_4 \cdot (d_4 + l_{42} \cdot \tan \theta_{42})$, and $l_{42} > \tan \alpha_4 \cdot (d_4 + l_{41} \cdot \tan \theta_{41})$.

According to another aspect of the invention, in the above liquid crystal display devices, the upper shading layer and the lower shading layer are each formed of one of the following: a metal film (Al, Ta, Ti, W, Mo, Cr, Ni), a singled layered film made for example of polysilicon, AlSi, $MoSi_2$, $TaSi_2$, $TiSi_2$, $WSi_2$, $CoSi_2$, $NiSi_2$, PtSi, $Pd_2S$, HfN, ZrN, TiN, TaN, NbN, TiC, TaC or $TiB_2$, or of a structure formed by laminating said films.

Even further, the present invention provides a liquid crystal display device according to the above, wherein either the upper shading layer or the lower shading layer, or both said upper and lower shading layers, is or are also used for wiring.

Moreover, the present invention provides a method for manufacturing the liquid crystal display device according to any disclosed above, wherein the layer underneath either the upper shading layer or the lower shading layer is formed using $SiO_2$, which is isotopically etched through HF using a resist mask, and removed of the mask before either the upper shading layer or the lower shading layer is formed thereon.

Lastly, the present invention provides a method for manufacturing the liquid crystal display device according to any disclosed above, wherein the layer underneath either the upper shading layer or the lower shading layer is formed using $SiO_2$, which is isotopically dry-etched using a resist mask, and removed of the mask before either the upper shading layer or the lower shading layer is formed thereon.

BRIEF DESCRIPTION OF THE DRAWINGS

FIG. 10 is an explanatory view showing the incident light to the switching element in the prior art liquid crystal display device;

DETAILED DESCRIPTION OF PREFERRED EMBODIMENTS

The preferred embodiment of the present invention will now be explained.

Figure 1:
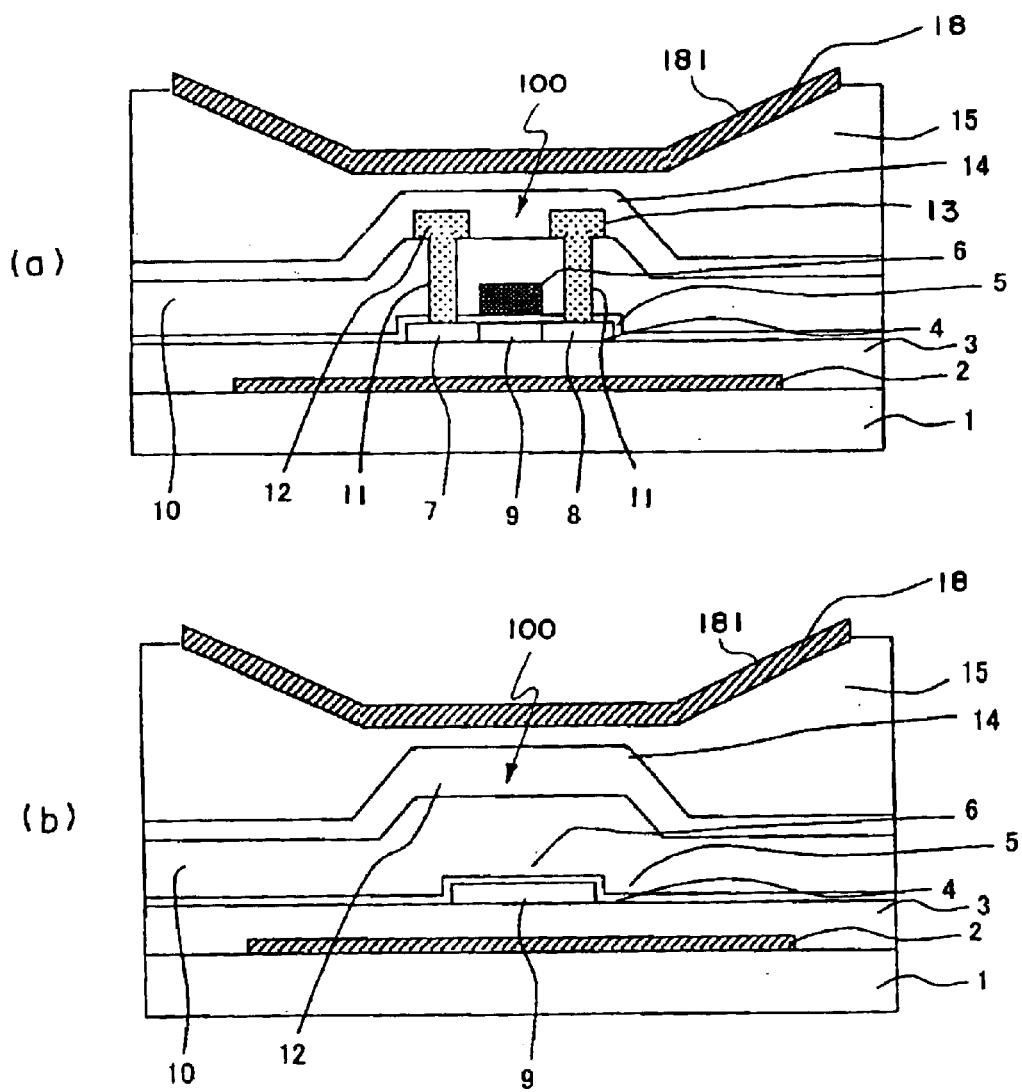
FIG. 1 is an explanatory cross-sectional view around a switching element in the liquid crystal display device of embodiment 1.
Figure 2:
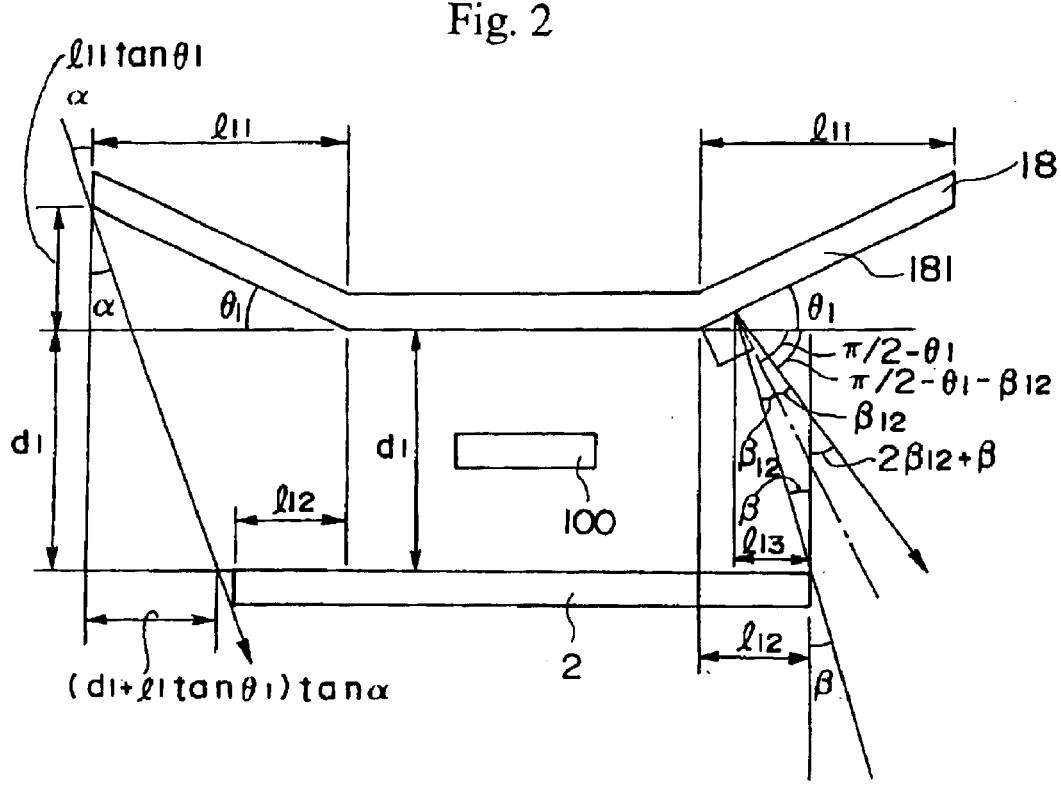
FIG. 2 is an explanatory view showing the reflection of the incident light to the switching element of the liquid crystal display device according to embodiment 1.
Figure 3:
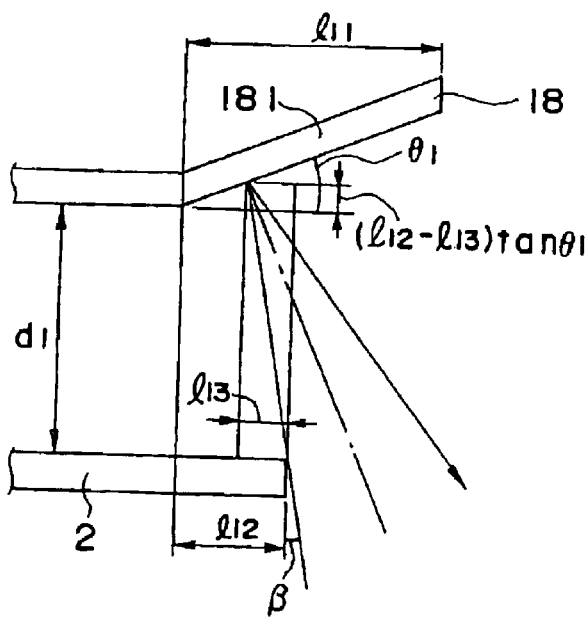
FIG. 3 is an explanatory view sowing the switching element and the sloped portion of a shading layer in the liquid crystal display device of embodiment 1.
Figure 4:
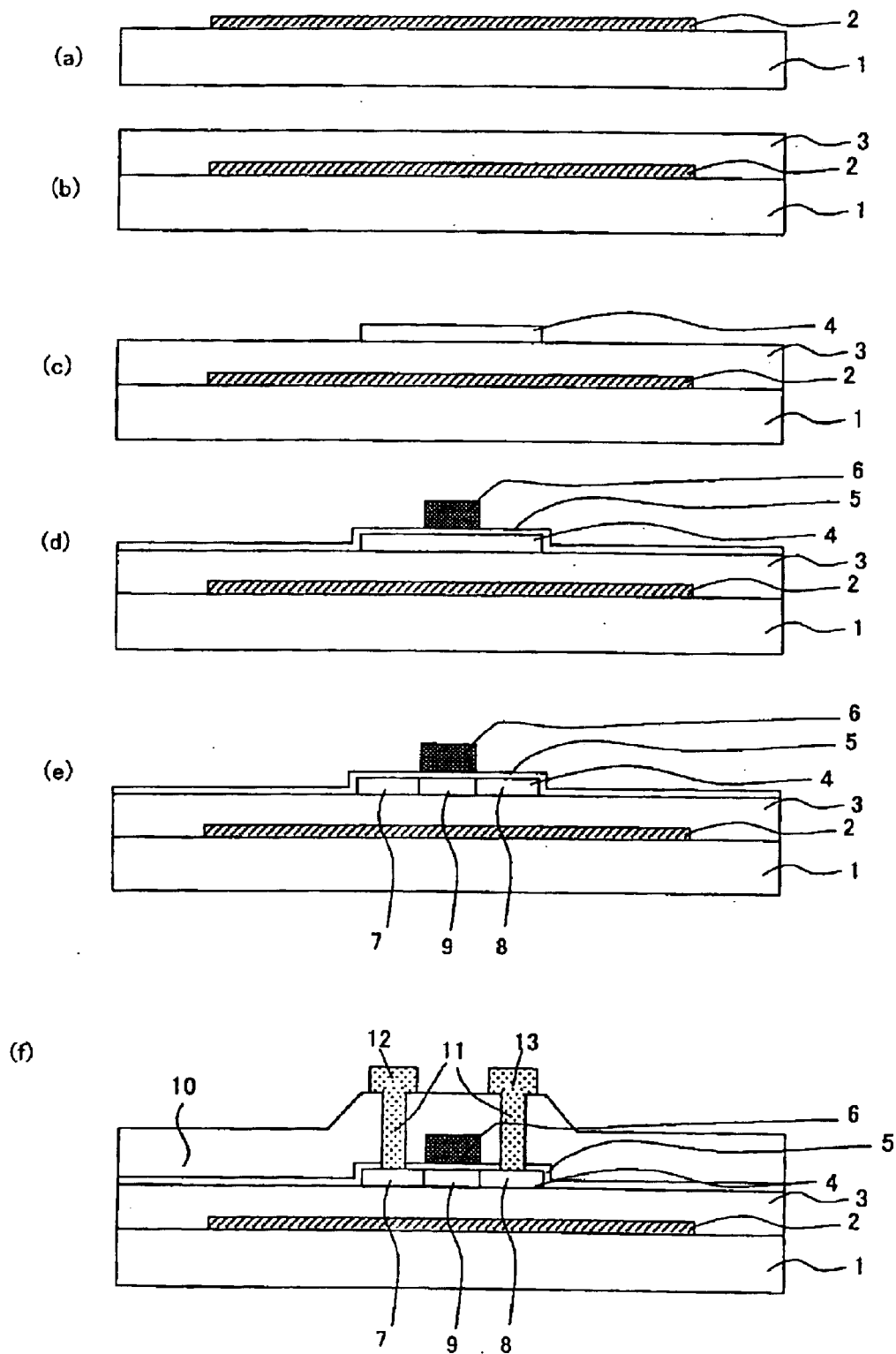
FIG. 4 is an explanatory view showing the former half of the steps for manufacturing the switching element and the like of the liquid crystal display device according to embodiment 1.
Figure 5:
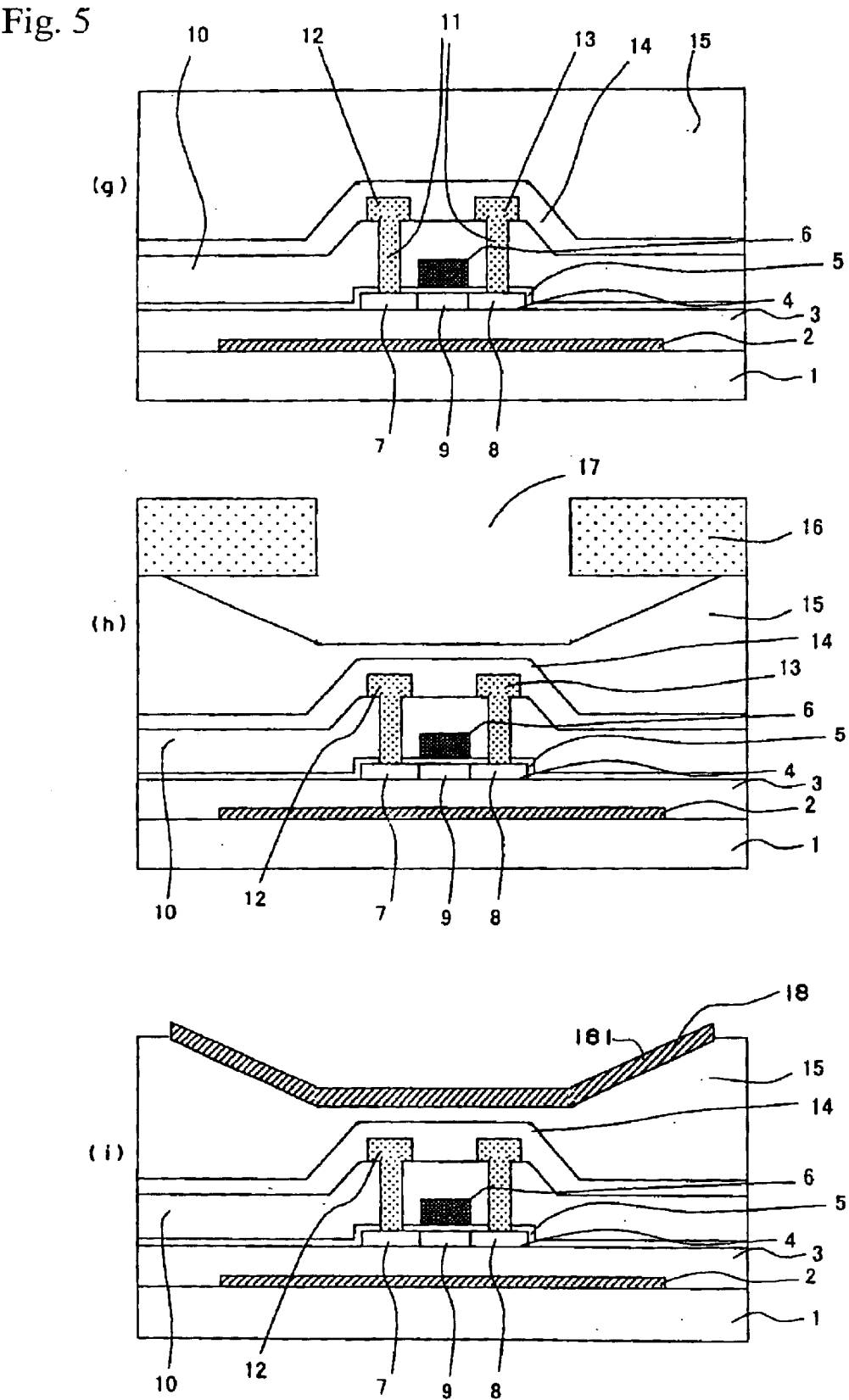
FIG. 5 is an explanatory view showing the latter half of the steps for manufacturing the switching element and the like of the liquid crystal display device according to embodiment 1.
Figure 6:
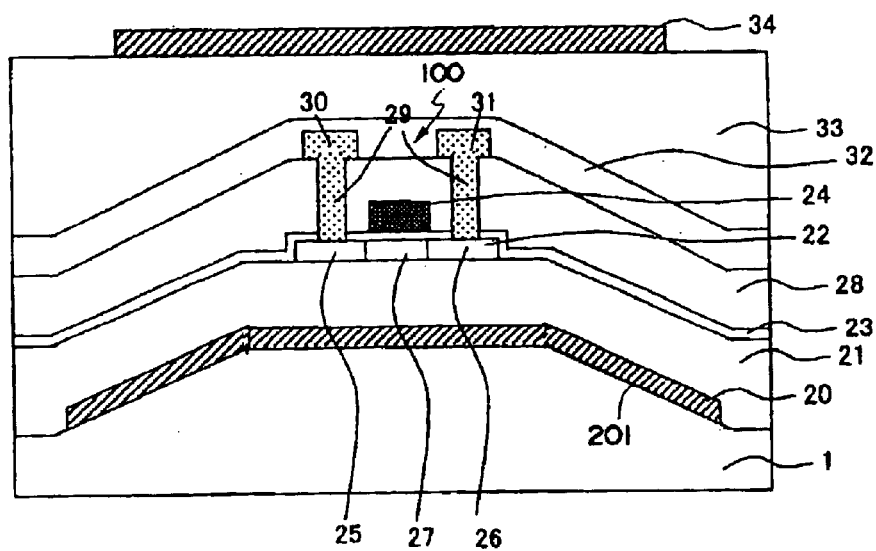
FIG. 6 is an explanatory cross-sectional view around a switching element in a liquid crystal display device according to embodiment 2.
Figure 7:
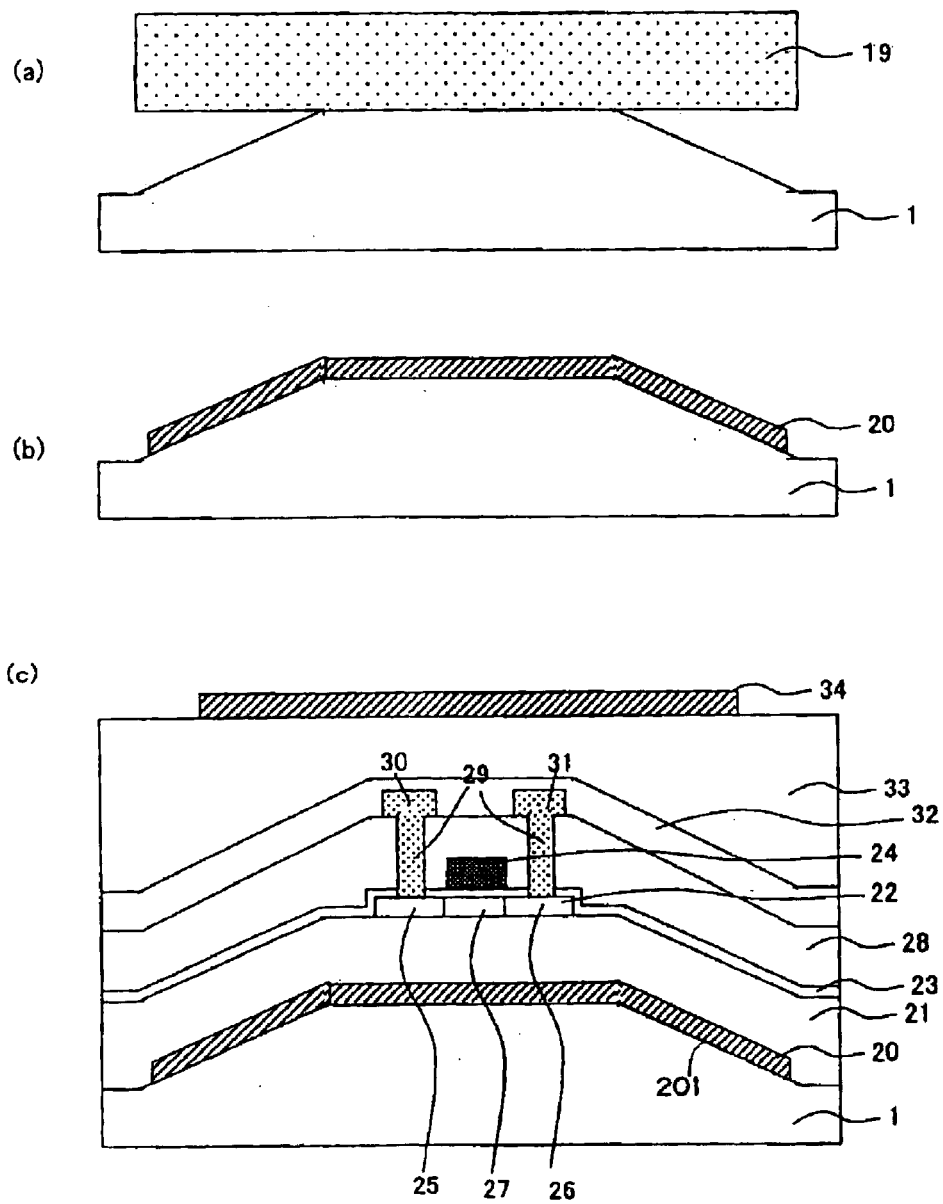
FIG. 7 is an explanatory view showing the steps for manufacturing the switching element and the like of the liquid crystal display according to embodiment 2.
Figure 8:
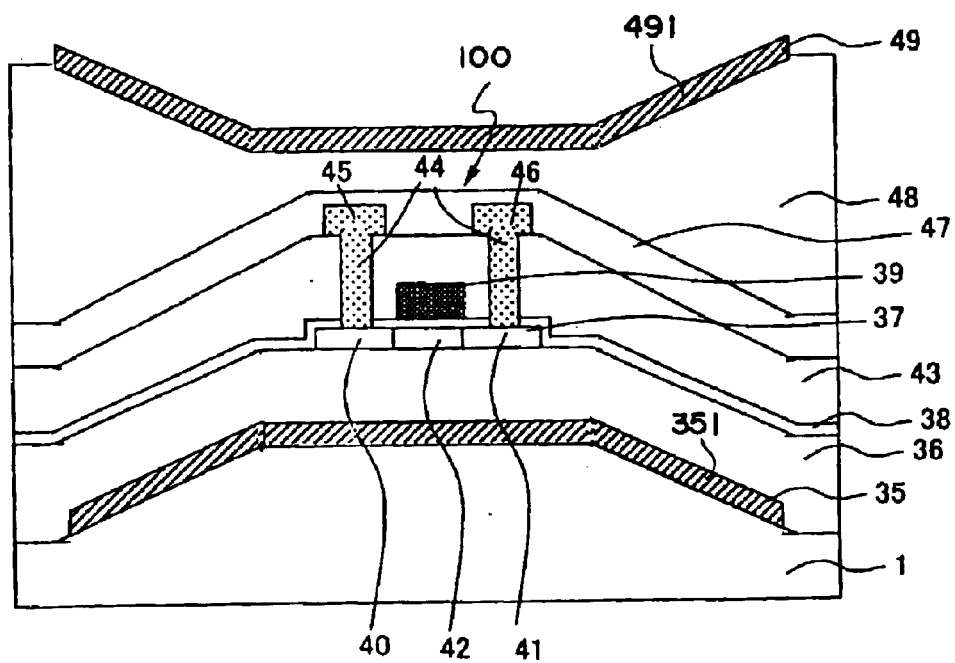
FIG. 8 is an explanatory cross-sectional view showing the periphery of a switching element in a liquid crystal display device according to embodiment 3.
Figure 9:
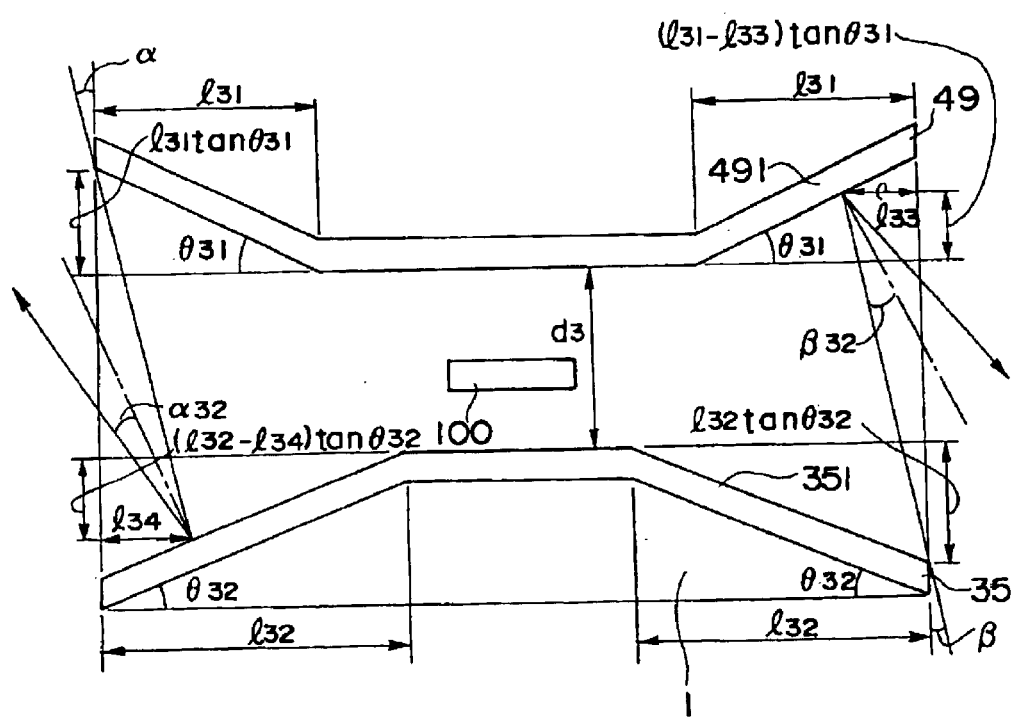
FIG. 9 is an explanatory view showing the reflection of incident light to the switching element of the liquid crystal display device according to embodiment 3.
Figure 11:
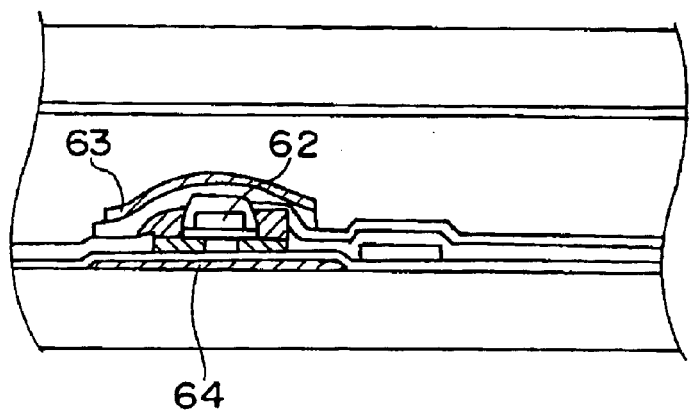
FIG. 11 is an explanatory cross-sectional view around the switching element according to the liquid crystal display device of prior art example 1.
Figure 12:
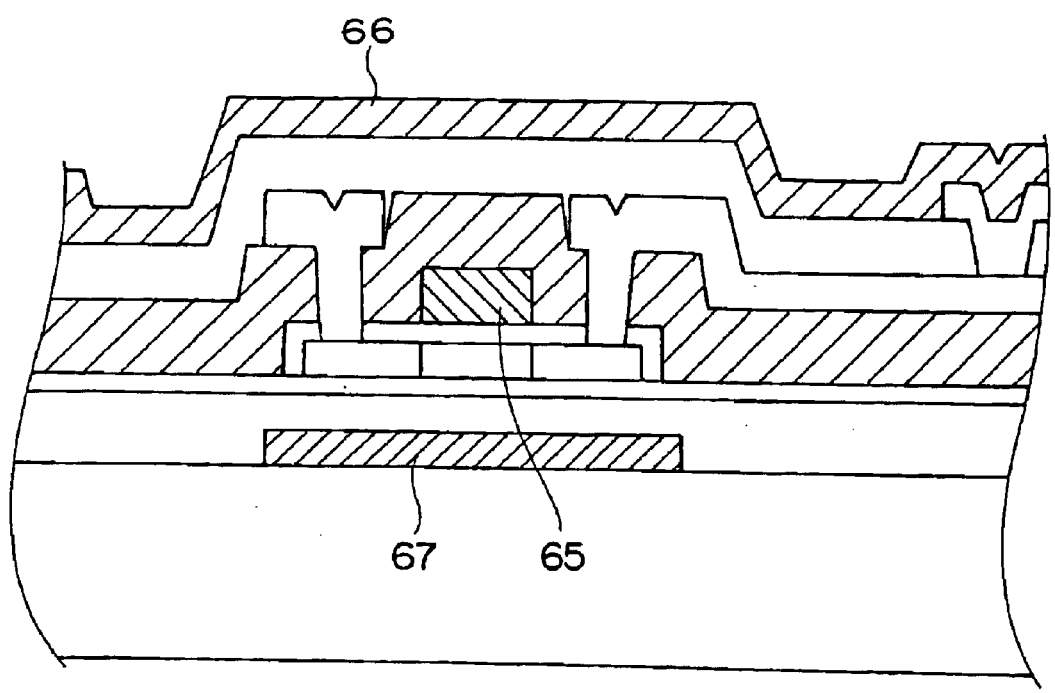
FIG. 12 is an explanatory cross-sectional view around the switching element according to the liquid crystal display device of prior art example 2.
Figure 13:
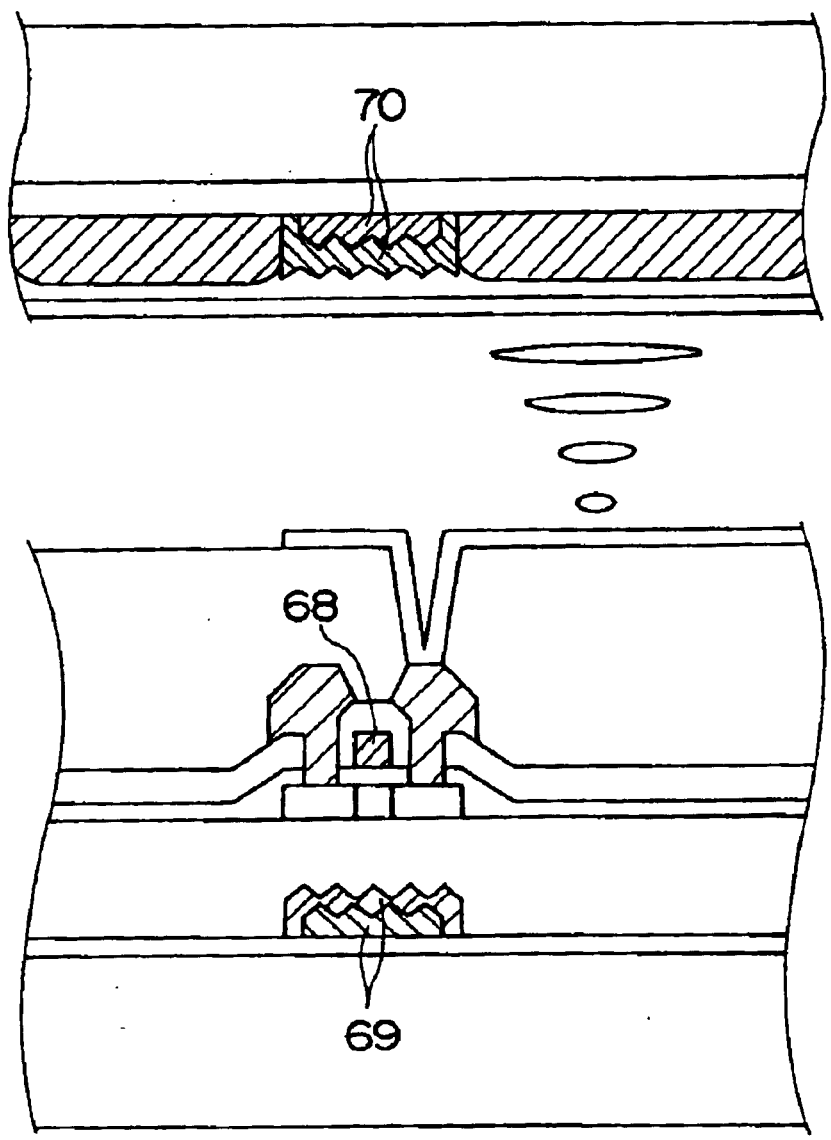
FIG. 13 is an explanatory cross-sectional view around the switching element according to the liquid crystal display device of prior art example 3.

FIGS. 1 through 9 are used to explain the embodiments of the liquid crystal display device and the method for manufacturing the same according to the present invention. FIG. 1 is an explanatory cross-sectional view around a switching element in the liquid crystal display device of embodiment 1. FIG. 2 is an explanatory view showing the reflection of the incident light to the switching element of the liquid crystal display device according to embodiment 1. FIG. 3 is an explanatory view sowing the switching element and the sloped portion of a shading layer in the liquid crystal display device of embodiment 1. FIG. 4 is an explanatory view showing the former half of the steps for manufacturing the switching element and the like of the liquid crystal display device according to embodiment 1. FIG. 5 is an explanatory view showing the latter half of the steps for manufacturing the switching element and the like of the liquid crystal display device according to embodiment 1. FIG. 6 is an explanatory cross-sectional view around a switching element in a liquid crystal display device according to embodiment 2. FIG. 7 is an explanatory view showing the steps for manufacturing the switching element and the like in the liquid crystal display device of embodiment 2. FIG. 8 is an explanatory cross-sectional view around a switching element in a liquid crystal display device according to embodiment 3. FIG. 9 is an explanatory view showing the reflection of incident light to the switching element of the liquid crystal display device according to embodiment 3.

Embodiment 1 will now be explained. The present embodiment will be explained with reference to FIGS. 1 through 3, the direction of alignment of the switching elements being referred to as the horizontal direction, and the liquid crystal layer side being referred to as the lower side. The active matrix liquid crystal display device according to the present embodiment comprises a liquid crystal cell, switching elements arranged in matrix, and so on. The switching element 100 comprises an insulation film 3, an active layer 4, a gate insulation film 5, a gate electrode 6, a source region 7, a drain region 8, a channel region 9, an interlayer insulation film 10, a contact hole 11 for taking out the electrodes, a source electrode 12, a drain electrode 13, a nitride film 14, an oxide film 15, and so on. On the upper side and the lower side of the switching element 100 are arranged, as shown in FIG. 1(*a*), a transparent substrate 1, a lower shading layer 2, an upper shading layer 18, and so on. The upper shading layer 18 is formed to have an upper sloped portion 181, so as to have a convex shape protruding toward the switching element. The lower shading layer 2 is flat. FIG. 1(*b*) is an explanatory cross-sectional view taken in the channel width direction at either the source end or the drain end of the channel region.

The shading layers 2 and 18 of embodiment 1 will be explained in detail. As for the upper shading layer 18, the upper sloped portion is located at a $\theta_1$ angle to the horizontal direction, and the horizontal direction length of the upper sloped portion is $l_{11}$. As for the lower shading layer 2, the length from the end of the lower shading layer 2 to the point that the line drawn downward in the vertical direction from the origin of the upper sloped portion crosses the lower shading layer 2 is $l_{12}$. The incident angle of the light traveling obliquely from the upper shading layer side is $\alpha$, the maximum incident angle is $\alpha_1$, the incident angle of the light traveling obliquely from the lower shading layer side is $\beta$, the maximum incident angle is $\beta_1$, and the distance between the upper shading layer and the lower shading layer is set as $d_1$. According to the above, the two following formula must be fulfilled in order for the incident light coming in from the lower side to be reflected at the upper shading layer and to be reflected outward without reaching the TFT.

$$(\pi/2-\theta_1-\beta_{12})+(2\beta_{12}+\beta)=\pi/2$$

$$\beta_{12}>0$$

Accordingly, for $\beta_{12}$ $(=\theta_1-\beta)>0$ to be true for all $\beta(\beta\leq\beta_1)$, $\theta_1$ must be $$\theta_1>\beta_1 \qquad \text{formula (1-1)}$$

Moreover, as disclosed in FIG. 2, $$l_{12}>l_{13}$$

is necessary. Further, since $$l_{13}=(d_1+(l_{12}-l_{13})\cdot\tan\theta_1)\cdot\tan\beta_1$$

therefore $$l_{12}-l_{13}=(l_{12}-d_1\cdot\tan\beta)/(1+\tan\theta_1\cdot\tan\beta)$$

Accordingly, for every $\beta(\beta\leq\beta_1)$ to be $l_{12}>l_{13}$, $l_{12}$ must be $$l_{12}>d_1\cdot\tan\beta_1 \qquad \text{formula (1-2)}$$

Moreover, for the oblique incident light coming from the upper side to not be reflected by the flat lower shading film, $$l_{11}-l_{12}>(d_1+l_{11}\cdot\tan\theta_1)\cdot\tan\alpha_1$$

Since, $\tan\theta_1<1$ and $\tan\alpha_1<1$ in an ordinary condition, $$l_{11}>(l_{12}+d_1\cdot\tan\alpha_1)/(1-\tan\theta_1\cdot\tan\alpha_1) \qquad \text{formula (1-3)}$$

By forming the upper shading film 18 and the lower shading film 2 of the liquid crystal display device according to embodiment 1 so as to fulfill all the conditions of formula (1-1), (1-2) and (1-3), it is possible to prevent the oblique incident light coming both from the upper direction and the lower direction from reaching the TFT, while minimizing the size of the upper shading layer 18 and the lower shading layer 2.

One example of a method for manufacturing the switching element and its peripheral portion in the liquid crystal display device according to embodiment 1 will now be explained. As shown in FIG. 4(*a*), on the transparent substrate 1 made of glass or quartz and the like, a shading film constituting the lower shading layer of the transistor is deposited by a CVD method or a sputtering method and the like. Then, the formed film is patterned through photo/etching, in order to form the lower shading layer 2. As for the shading film, material having a light blocking effect is used, such as a metal film (Al, Ta, Ti, W, Mo, Cr, Ni), a single layered film made of polysilicon and the like, AlSi, $MoSi_2$, $TaSi_2$, $TiSi_2$, $WSi_2$, $CoSi_2$, $NiSi_2$, $PtSi$, $Pd_2S$, HfN, ZrN, TiN, TaN, NbN, TiC, TaC or $TiB_2$, or of a laminated structure of these materials.

As shown in FIG. 4(*b*), an insulation film 3, such as an $SiO_2$ film and the like, is deposited on the whole surface.

As shown in FIG. 4(*c*), an active layer 4 of the transistor is formed on the insulation film 3. The active layer is a semiconductor body such as Si, Ge, GaAs or Gap, and it can be amorphous, polycrystal, or single crystal. For example, in the case of a polycrystal silicon, generally, an amorphous silicon thin film is deposited on the insulation film 3 to a thickness of 50 to 150 nm, and thereafter, the thin film is polycrystalized either by treating the same under high temperature or by radiating laser beam thereto. Thereafter, patterning is performed to the film through photo/etching, in order to obtain an active layer 4 having a desired shape. Further, impurity ion implantation may be performed in order to control the threshold voltage.

Then, as shown in FIG. 4(*d*), a gate insulation film 5 is formed on the active layer 4. The gate insulation film can be formed by CVD, by oxidation, or by both. Next, a gate electrode 6 is formed on the gate insulation film.

Next, as shown in FIG. 4(*e*), impurity ion implantation is performed using the gate electrode as the mask, in order to form a source region 7 and a drain region 8. The region to which ion implantation is not performed becomes the channel region 9.

Then, as shown in FIG. 4(*f*), insulation film is deposited on the whole surface, thereby forming an interlayer insulation film 10. Next, contact holes 11 are formed over the source region 7 and the drain region 8 for taking out electrodes. Then, a source electrode 12 and a drain electrode 13 made of metal material such as Al is formed.

Thereafter, as shown in FIG. 5(*g*), a nitride film 14 and an oxide film 15 is deposited on the whole surface in order to create a passivation film. Then, hydrogenation process is performed. Next, etch back or CMP and the like is performed to form a flat surface.

Next, as shown in FIG. 5(*h*), wet etching is performed through HF and the like, using resist 16 as the mask. Since wet etching is an isotropic etching, the etching spreads wider than the opening portion 17 of the resist 16, and forms a shape as shown in FIG. 5(h). Accordingly, the position of the resist mask and the size of the opening of the resist 16 are to be formed based on the idea disclosed in the "summary (means to solve the problem)". Moreover, the process accuracy of the photolithography and the etching and the alignment accuracy of the resist to the lower shading layer and the TFT active layer should be considered when forming the resist 16. Dry etching using gas such as $CF_4$ or $CF_4+CHF_3$ could be performed instead of the wet etching.

Next, as shown in FIG. 5(i), after removing the resist 16, the shading film constituting the upper shading layer of the transistor is deposited through a CVD method or a sputtering method and the like. The shading film is patterned through photo/etching so that the oblique incident light coming from the upper shading layer side will not be reflected by the lower shading film, thereby creating an upper shading film 18. As mentioned, various materials can be used to manufacture the shading film.

After that, an insulation film not shown is formed, and a contact hole is formed on the insulation film. Then, a transparent electrode such as ITO is electrically connected to the drain electrode 13. Then, upper and lower shading layers are further formed in the channel width direction. Thereby, the incident light coming from the upper and lower sides are prevented from reaching the TFT.

Embodiment 2 will now be explained. The explanatory cross-sectional of the switching element 100 and the peripheral thereof in the liquid crystal display device according to embodiment 2 is shown in FIG. 6. Similar to embodiment 1 (FIG. 1), the switching element 100 comprises a transparent substrate 1, a lower shading layer 20, an insulation film 21, an active layer 22, a gate insulation film 23, a gate electrode 24, a source region 25, a drain region 26, a channel region 27, an interlayer insulation film 28, a contact hole 29 for taking out the electrodes, a source electrode 30, a drain electrode 31, a nitride film 32, an oxide film 33, an upper shading layer 34, and so on. Upper and lower shading layers 20 and 34 are positioned above and under the switching element 100 arranged in matrix. The difference from embodiment 1 is that according to embodiment 2, the shading layer 20 including a sloped portion 201 and having a convex shape protruding toward the switching element 100 is placed under the switching element.

As for the lower shading layer 20, the lower sloped portion 201 is located at a $\theta_2$ angle to the horizontal direction, and the horizontal direction length of the lower sloped portion is $l_{21}$. As for the upper shading layer 34, the length from the end of the upper shading layer 34 to the point that the line drawn upward in the vertical direction from the origin of the lower sloped portion 201 crosses the upper shading layer 34 is $l_{22}$. The maximum incident angle of the light traveling obliquely from the lower shading layer 20 side is $\alpha_2$, the incident angle of the light traveling obliquely from the upper shading layer 34 side is $\beta$, the maximum incident angle is $\beta_2$, and the distance between the upper shading layer 34 and the lower shading layer 20 is set as $d_2$. According to the above, $\theta_2$, $l_{21}$ and $l_{22}$ are each set as $$\theta_2 > \beta_2 \quad \text{formula (2-1)}$$

$$l_{21} > (l_{22}+d_2 \cdot \tan \alpha_2)/(1-\tan \theta_2 \cdot \tan \alpha_2) \quad \text{formula (2-2)}$$

$$l_{22} > d_2 \cdot \tan \beta_2 \quad \text{formula (2-3)}$$

Similar to embodiment 1, by forming the upper shading film 34 and the lower shading film 20 of the liquid crystal display device according to embodiment 2 to fulfill all the conditions of formula (2-1), (2-2) and (2-3), it is possible to form a liquid crystal display device capable of preventing the oblique incident light coming both from the upper direction and the lower direction from reaching the TFT, while minimizing the size of the upper shading layer 34 and the lower shading layer 20.

One example of the method for manufacturing the liquid crystal display device according to embodiment 2 will be explained with reference to FIG. 7. As shown in FIG. 7(a), wet etching is performed through HF and the like, using resist 19 as the mask. Since wet etching is an isotropic etching, it forms the sloped portion 201 of the lower shading layer 20. The resist 19 is designed taking into consideration the process accuracy of the photolithography and the etching, and the alignment accuracy of the resist to the upper shading layer 34 and the TFT active layer 22. Moreover, dry etching using gas such as $CF_4$ or $CF_4+CHF_3$ and the like could be performed instead of the wet etching.

Next, as shown in FIG. 7(b), after removing the resist 19, the shading film constituting the lower shading layer 20 of the transistor is deposited through a CVD method or a sputtering method and the like. The shading film is then patterned through photo/etching so that the oblique incident light coming from the lower shading layer 20 side will not be reflected by an upper shading film 34 formed in the latter step, thereby creating the lower shading film 20. As mentioned in embodiment 1, various materials can be used to manufacture the shading film.

After that, an insulation film 21 made of $SiO_2$ film and the like is formed on the whole surface, similar to embodiment 1, and an active layer 22 of the transistor is formed on the insulation film 21. The method for forming the active layer is the same as that of embodiment 1. Then, the layer is patterned by photo/etching, in order to obtain the active layer 22 having the desired form. If necessary, an impurity ion implantation may be performed at this stage for controlling the threshold voltage. Next, a gate insulation film 23 is formed on the active layer 22. The gate insulation film is either formed by CVD, by oxidation, or by the combination of both. Next, a gate electrode 24 is formed on the gate insulation film.

Next, impurity ion implantation is performed using the gate electrode as the mask, in order to form a source region 25 and a drain region 26. The region to which ion implantation is not performed becomes the channel region 27.

Then, insulation film is deposited on the whole surface, in order to form an interlayer insulation film 28. Next, contact holes 29 are formed over the source region 25 and the drain region 26 for taking out electrodes. Then, a source electrode 30 and a drain electrode 31 made of metal material such as Al is formed.

Thereafter, a nitride film 32 and an oxide film 33 is deposited on the whole surface in order to create a passivation film. Then, hydrogenation process is performed. Next, etch back or CMP and the like is performed to flatten the surface.

A shading film constituting the upper shading layer 34 of the transistor is deposited by a CVD method or a sputtering method and the like. Then, the formed film is patterned through photo/etching in order to form the upper shading layer 34. The shading film is formed using material having a light blocking effect, such as a metal film (Ta, Ti, W, Mo, Cr, Ni), a single layered film made of polysilicon, $MoSi_2$, $TaSi_2$, $WSi_2$, $CoSi_2$, $NiSi_2$, PtSi, $Pd_2S$, HfN, ZrN, TiN, TaN, NbN, TiC, TaC or $TiB_2$, or of a combination of these materials.

Thereafter, an insulation film 28 not shown is formed, followed by a contact hole 29 formed on the insulating film.

A transparent electrode such as ITO is electrically connected to the drain electrode 31. The above method realizes a liquid crystal display device that is capable of preventing incident light coming from upper and lower directions from reaching the TFT.

Embodiment 3 will now be explained. The switching element of the liquid crystal display device according to the present in embodiment characterizes in that both the upper shading layer and the lower shading layer have sloped portions. The embodiment is explained with reference to FIG. 8. FIG. 8 shows an example where the ends of the upper and lower shading films are aligned. As for the upper shading layer 49, the upper sloped portion 491 is located at a $\theta_{31}$ angle to the horizontal direction, and the horizontal direction length of the upper sloped portion is $l_{31}$. As for the lower shading layer 35, the lower sloped portion 351 is located at a $\theta_{32}$ angle to the horizontal direction, and the horizontal direction length of the lower sloped portion 351 is $l_{32}$. The maximum incident angle of the light traveling obliquely from the upper shading layer 49 side is $\alpha_3$, the maximum incident angle of the incident light traveling obliquely from the lower shading layer 35 side is $\beta_3$, and the distance between the upper shading layer 49 and the lower shading layer 35 is set as $d_3$. According to the above, the two following formula must be fulfilled in order for the incident light coming in from the lower side to be reflected by the upper shading layer 49 and to be reflected outward without reaching the TFT.

$$(\pi/2-\theta_{31})+(2\beta_{32}+\beta)=\pi/2$$

$$\beta_{32}>0$$

Accordingly, for $\beta_{32}(=\theta_{31}-\beta)>0$ to be true for all $\beta(\beta \leq \beta_3)$, $\theta_{31}$ must be $$\theta_{31}>\beta_3 \qquad \text{formula (3-1)}$$

Moreover, it is necessary for $l_{33}$ to be $l_{33}<l_{31}$. Therefore, $$l_{33}=(d_3+l_{32}\cdot\tan\theta_{32}+(l_{31}-l_{33})\cdot\tan\theta_{31})\cdot\tan\beta$$

and $$l_{31}>\tan\beta_3\cdot(d_3+l_{32}\cdot\tan\theta_{32}) \qquad \text{formula (3-2)}$$

Similarly, in order for the oblique incident light coming from the upper area to be reflected by the lower shading layer 35 and to not reach the TFT but to reflect outward, the angle $\theta_{32}$ of the lower sloped portion 351 of the lower shading layer 35 must be $$\theta_{32}>\alpha_3 \qquad \text{formula (3-3)}$$

Moreover, it is necessary for $l_{34}$ to be $l_{34}<l_{32}$. Therefore, $$l_{32>tan}\alpha_3\cdot(d_3+l_{31}\cdot\tan\theta_{31}) \qquad \text{formula (3-4)}$$

By forming the upper shading layer 49 and the lower shading layer 35 of the liquid crystal display device to fulfill all the conditions of formula (3-1), (3-2), (3-3) and (3-4), it is possible to prevent the oblique incident light coming both from the upper direction and the lower direction from reaching the TFT, while minimizing the size of the upper shading layer 49 and the lower shading layer 35.

The method for manufacturing the liquid crystal display device according to embodiment 3 is realized by combining the methods of embodiment 1 and embodiment 2.

According to embodiment 3, shading layers 49 and 35 of the active matrix liquid crystal display device are respectively mounted on the upper and lower areas of the switching element arranged in matrix. The upper shading layer 49 and the lower shading layer 35 are each equipped with an upper sloped portion 491 or a lower sloped portion 351, and are each formed to protrude toward the switching element 100, with the lower sloped portion 351 formed longer than the upper sloped portion 491. However, according to another example, the active matrix liquid crystal display device may include an upper sloped portion that is longer than the lower sloped portion. According to such example, as for the lower shading layer, the lower sloped portion is located at a $\theta_{41}$ angle to the horizontal direction, and the horizontal direction length of the lower sloped portion is $l_{41}$. As for the upper shading layer, the upper sloped portion is located at a $\theta_{42}$ angle to the horizontal direction, and the horizontal direction length of the lower sloped portion is $l_{42}$. The maximum incident angle of the light traveling obliquely from the lower shading layer side is $\alpha_4$, the maximum incident angle of the light traveling obliquely from the upper shading layer side is $\beta_4$, and the distance between the upper shading layer and the lower shading layer is set as $d_4$. According to the above, $\theta_{41}$, $\theta_{42}$, $l_{41}$ and $l_{42}$ are each set as $$\theta_{41}>\beta_4 \qquad \text{formula (4-1)}$$

$$\theta_{42}>\alpha_4 \qquad \text{formula (4-2)}$$

$$l_{41}>\tan\beta_4\cdot(d_4+l_{42}\cdot\tan\theta_{42}) \qquad \text{formula (4-3)}$$

$$l_{42}>\tan\alpha_4\cdot(d_4+l_{41}\cdot\tan\theta_{41}) \qquad \text{formula (4-4)}$$

By forming the upper shading layer and the lower shading layer of the liquid crystal display device so that they fulfill all the conditions of formula (4-1), (4-2), (4-3) and (4-4), it is possible to form an active matrix liquid crystal display an device capable of preventing the oblique incident light coming both from the upper direction and the lower direction from reaching the TFT, while minimizing the size of the upper shading layer and the lower shading layer.

Moreover, the upper shading layer and the lower shading layer according to the embodiments could be further utilized as a wiring layer to which are formed source electrodes and drain electrodes. Further, each embodiment can be applied to a switching element of a TFT having an LDD structure, or to an active element having switching functions such as MIM.

As explained, the active matrix liquid crystal display according to the present embodiment is formed so that either one of or both the upper and lower shading layers have or has a sloped portion so that the layer is formed in a convex shape protruding toward the switching element. By providing such shading layer or shading layers to the active matrix liquid crystal display device, light is basically blocked before reaching the switching element. The off-characteristic of the switching element is improved according to the invention, which contributes to realizing a brighter and higher contrast display.

Moreover, by specifying the size and the angle of the sloped portions of the upper and lower shading layers, the incident light from the upper or lower shading layer side is prevented from reaching the TFT. According to the invention, leak current of the TFT is reduced, and a good liquid crystal characteristic is obtained. Even further, since the size (area) of the shading layers is minimized, the aperture rate is increased.

The active matrix liquid crystal display device according to the present embodiments comprises upper and lower shading layers formed of a metal film (Al, Ta, Ti, W, Mo, Cr, Ni), a single layered film made of polysilicon, AlSi, $MoSi_2$, $TaSi_2$, $TiSi_2$, $WSi_2$, $CoSi_2$, $NiSi_2$, $PtSi$, $Pd_2S$, $HfN$, $ZrN$, $TiN$, $TaN$, $NbN$, $TiC$, $TaC$ or $TiB_2$, or a laminated structure formed of these materials. Accordingly, the shading layers provide high light blocking effect, which leads to improving the TFT characteristics.

The active matrix liquid crystal display device according to the embodiment utilizes at least either the upper or the lower shading layer as a wiring layer. This feature contributes to simplifying the manufacture steps and to reducing the manufacturing cost.

According to an embodiment of the active matrix liquid crystal display device, the layer underneath the upper shading layer or the lower shading layer is formed by $SiO_2$, which is etched isotropically through HF using a resist mask, the upper or lower shading layer being formed on this layer after removing the resist. This enables the sloped portion of the shading layer to be formed relatively easily with good control and good repeatability. Moreover, by proper selection of the agent for the etching, the resist mask material, and the material of the layer underneath the shading layer being etched, a shading layer including a sloped portion having the desired angle can be formed.

According to another embodiment of the active matrix liquid crystal display device, the layer underneath the upper shading layer or the lower shading layer is formed by $SiO_2$, which is dry-etched isotropically using a resist mask, the upper or lower shading layer being formed on this layer after removing the resist. This enables the sloped portion of the shading layer to be formed relatively easily with good control and good repeatability. Moreover, by proper selection of the gas material and the gas pressure for etching, a shading layer including a sloped portion having a desired angle can be formed.

In general, the dispersion of the incident light (the light provided from the light source to the liquid crystal display device) is ±15 degrees at maximum, and the dispersion of the reflected light (the light that once passed through the liquid crystal display device being reflected at the back surface of the glass substrate or the surface of the lens system and returning to the display device) is ±20 degrees at maximum. Therefore, the angle of the sloped portion of the upper shading layer is approximately 20 degrees at maximum, and the angle of the sloped portion of the lower shading layer is approximately 15 degrees at maximum.

Effect of the Invention

The present invention enables to provide an active matrix liquid crystal display having improved brightness and higher contrast, and the method for manufacturing the same.

What is claimed is:

1. An active matrix liquid crystal display device comprising a liquid crystal cell, a switching element arranged in matrix, and shading layers mounted both on the upper side and the lower side of said switching element; the upper shading layer including an upper sloped portion and having a convex shape protruding toward said switching element, the lower shading layer having a flat shape: wherein
said upper shading layer is formed so that said upper sloped portion is located at a $\theta_1$ angle to the horizontal direction, and said upper sloped portion has a horizontal direction length of $1_{11}$; said lower shading layer is formed so that the length from the end of said lower shading layer to the point that the line drawn downward to the vertical direction from the origin of said upper sloped portion crosses said lower shading layer is $1_{12}$; and the maximum incident angle of the light traveling obliquely from the upper shading layer side is $\alpha_1$, the maximum incident angle of the light traveling obliquely from the lower shading layer side is $\beta_1$, and the distance between the upper shading layer and the lower shading layer is $d_1$;
in which $\theta_1$, $1_{11}$ and $1_{12}$ each fulfill $\theta_1 > \beta_1$, $1_{11} > (1_{12} + d_1 \cdot \tan \alpha_1)/(1 - \tan \theta_1 \cdot \tan \alpha_1)$, and $1_{12} > d_1 \cdot \tan \beta_1$.

2. An active matrix liquid crystal display device comprising a liquid crystal cell, a switching element arranged in matrix, and shading layers mounted both on the upper side and the lower side of said switching element; the lower shading layer including a lower sloped portion and having a convex shape protruding toward said switching element, the upper shading layer having a flat shape: wherein
said lower shading layer is formed so that said lower sloped portion is located at a $\theta_2$ angle to the horizontal direction, and said lower sloped portion has a horizontal direction length of $1_{21}$; said upper shading layer is formed so that the length from the end of said upper shading layer to the point that the line drawn upward to the vertical direction from the origin of said lower sloped portion crosses said upper shading layer is $1_{22}$; and the maximum incident angle of the light traveling obliquely from the lower shading layer side is $\alpha_2$, the maximum incident angle of the light traveling obliquely from the upper shading layer side is $\beta_2$, and the distance between the upper shading layer and the lower shading layer is $d_2$;
in which $\theta_2$, $1_{21}$ and $1_{22}$ each fulfill $\theta_2 > \beta_2$, $1_{21} > (1_{22} + d_2 \cdot \tan \alpha_2)/(1 - \tan \theta_2 \cdot \tan \alpha_2)$, and $1_{22} > d_2 \cdot \tan \beta_2$.

3. An active matrix liquid crystal display device comprising a liquid crystal cell, a switching element arranged in matrix, and shading layers mounted both on the upper side and the lower side of said switching element; the upper and lower shading layers respectively including an upper sloped portion or a lower sloped portion, both having a convex shape protruding toward said switching element, and said lower sloped portion formed longer than said upper sloped portion: wherein
said upper shading layer is formed so that said upper sloped portion is located at a $\theta_{31}$ angle to the horizontal direction, and said upper sloped portion has a horizontal direction length of $1_{31}$; said lower shading layer is formed so that said lower sloped portion is located at a $\theta_{32}$ angle to the horizontal direction, and said lower sloped portion has a horizontal direction length of $1_{32}$; and the maximum incident angle of the light traveling obliquely from the upper shading layer side is $\alpha_3$, the maximum incident angle of the light traveling obliquely from the lower shading layer side is $\beta_3$, and the distance between the upper shading layer and the lower shading layer is $d_3$;
in which $\theta_{31}$, $\theta_{32}$, $1_{31}$ and $1_{32}$ each fulfill $\theta_{31} > \beta_3$, $\theta_{32} > \alpha_3$, $1_{31} > \tan \beta_3 \cdot (d_3 + 1_{32} \cdot \tan \theta_{32})$, and $l_{32} > \tan \alpha_3 \cdot (d_3 + l_{31} \tan \theta_{31})$.

4. An active matrix liquid crystal display device comprising a liquid crystal cell, a switching element arranged in matrix, and shading layers mounted both on the upper side and the lower side of said switching element; the upper and lower shading layers respectively including an upper sloped portion or a lower sloped portion, both having a convex shape protruding toward said switching element, and said upper sloped portion formed longer than said lower sloped portion: wherein said lower shading layer is formed so that said lower sloped portion is located at a $\theta_{41}$ angle to the horizontal direction, and said lower sloped portion has a horizontal direction length of $l_{41}$; said upper shading layer is formed so that said upper sloped portion is located at a $\theta_{42}$ angle to the horizontal direction, and said upper sloped portion has a horizontal direction length of $l_{42}$; and the maximum incident angle of the light traveling obliquely from the lower shading layer side is $\alpha_4$, the maximum incident angle of the light traveling obliquely from the upper shading layer side is $\beta_4$, and the distance between the lower shading layer and the upper shading layer is $d_4$;

in which $\theta_{41}$, $\theta_{42}$, $l_{41}$ and $l_{42}$ each fulfill $\theta_{41} > \beta_4$, $\theta_{42} > \alpha_4$, $l_{41} > \tan \beta_4 \cdot (d_4 + l_{42} \cdot \tan \theta_{42})$, and $l_{42} > \tan \alpha_4 \cdot (d_4 + l_{41} \cdot \tan \theta_{41})$.

5. The liquid crystal display device according to claim 1, wherein
said upper shading layer and said lower shading layer are each formed of one of the following: a metal film (Al, Ta, Ti, W, Mo, Cr, Ni), a single layered film made of polysilicon and the like, AlSi, $MoSi_2$, $TaSi_2$, $TiSi_2$, $WSi_2$, $CoSi_2$, $NiSi_2$, PtSi, $Pd_2S$, HfN, ZrN, TiN, TaN, NbN, TiC, TaC or $TiB_2$, or of a structure formed by laminating said films.

6. The liquid crystal display device according to claim 1, wherein
either said upper shading layer or said lower shading layer or both said upper and lower shading layers is or are also used for wiring.

7. A method for manufacturing the liquid crystal display device according to claim 1, wherein
the layer underneath either the upper shading layer or the lower shading layer is formed using $SiO_2$, which is isotopically etched through HF using a resist mask, and removed of said mask before either the upper shading layer or the lower shading layer is formed thereon.

8. A method for manufacturing the liquid crystal display device according to claim 1, wherein the layer underneath either the upper shading layer or the lower shading layer is formed using $SiO_2$, which is isotopically dry-etched using a resist mask, and removed of said mask before either the upper shading layer or the lower shading layer is formed thereon.

9. The liquid crystal display device according to claim 2, wherein
said upper shading layer and said lower shading layer are each formed of one of the following: a metal film (Al, Ta, Ti, W, Mo, Cr, Ni), a single layered film made of polysilicon and the like, AlSi, $MoSi_2$, $TaSi_2$, $TiSi_2$, $WSi_2$, $CoSi_2$, $NiSi_2$, PtSi, $Pd_2S$, HfN, ZrN, TiN, TaN, NbN, TiC, TaC or $TiB_2$, or of a structure formed by laminating said films.

10. The liquid crystal display device according to claim 2, wherein
either said upper shading layer or said lower shading layer or both said upper and lower shading layers is or are also used for wiring.

11. A method for manufacturing the liquid crystal display device according to claim 2, wherein
the layer underneath either the upper shading layer or the lower shading layer is formed using $SiO_2$, which is isotopically etched through HF using a resist mask, and removed of said mask before either the upper shading layer or the lower shading layer is formed thereon.

12. A method for manufacturing the liquid crystal display device according to claim 2, wherein the layer underneath either the upper shading layer or the lower shading layer is formed using $SiO_2$, which is isotopically dry-etched using a resist mask, and removed of said mask before either the upper shading layer or the lower shading layer is formed thereon.

13. The liquid crystal display device according to claim 3, wherein
said upper shading layer and said lower shading layer are each formed of one of the following: a metal film (Al, Ta, Ti, W, Mo, Cr, Ni), a single layered film made of polysilicon and the like, AlSi, $MoSi_2$, $TaSi_2$, $TiSi_2$, $WSi_2$, $CoSi_2$, $NiSi_2$, PtSi, $Pd_2S$, HfN, ZrN, TiN, TaN, NbN, TiC, TaC or $TiB_2$, or of a structure formed by laminating said films.

14. The liquid crystal display device according to claim 3, wherein
either said upper shading layer or said lower shading layer or both said upper and lower shading layers is or are also used for wiring.

15. A method for manufacturing the liquid crystal display device according to claim 3, wherein
the layer underneath either the upper shading layer or the lower shading layer is formed using $SiO_2$, which is isotopically etched through HF using a resist mask, and removed of said mask before either the upper shading layer or the lower shading layer is formed thereon.

16. A method for manufacturing the liquid crystal display device according to claim 3, wherein the layer underneath either the upper shading layer or the lower shading layer is formed using $SiO_2$, which is isotopically dry-etched using a resist mask, and removed of said mask before either the upper shading layer or the lower shading layer is formed thereon.

17. The liquid crystal display device according to claim 4, wherein
said upper shading layer and said lower shading layer are each formed of one of the following: a metal film (Al, Ta, Ti, W, Mo, Cr, Ni), a single layered film made of polysilicon and the like, AlSi, $MoSi_2$, $TaSi_2$, $TiSi_2$, $WSi_2$, $CoSi_2$, $NiSi_2$, PtSi, $Pd_2S$, HfN, ZrN, TN, TaN, NbN, TiC, TaC or $TiB_2$, or of a structure formed by laminating said films.

18. The liquid crystal display device according to claim 4, wherein
either said upper shading layer or said lower shading layer or both said upper and lower shading layers is or are also used for wiring.

19. A method for manufacturing the liquid crystal display device according to claim 4, wherein the layer underneath either the upper shading layer or the lower shading layer is formed using $SiO_2$, which is isotopically etched through HF using a resist mask, and removed of said mask before either the upper shading layer or the lower shading layer is formed thereon.

20. A method for manufacturing the liquid crystal display device according to claim 4, wherein the layer underneath either the upper shading layer or the lower shading layer is formed using $SiO_2$, which is isotopically dry-etched using a resist mask, and removed of said mask before either the upper shading layer or the lower shading layer is formed thereon.

* * * * *